(12) United States Patent
Mazzane

(10) Patent No.: US 12,304,622 B2
(45) Date of Patent: May 20, 2025

(54) METHOD FOR ADJUSTING THE ANGULAR POSITION OF A WHEEL, IN PARTICULAR A WHEEL OF AN AIRCRAFT LANDING GEAR

(71) Applicant: SAFRAN LANDING SYSTEMS, Velizy-Villacoublay (FR)

(72) Inventor: Ismail Mazzane, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 349 days.

(21) Appl. No.: 18/008,369

(22) PCT Filed: May 31, 2021

(86) PCT No.: PCT/EP2021/064480
§ 371 (c)(1),
(2) Date: Jun. 7, 2023

(87) PCT Pub. No.: WO2021/259591
PCT Pub. Date: Dec. 30, 2021

(65) Prior Publication Data
US 2024/0034462 A1 Feb. 1, 2024

(30) Foreign Application Priority Data
Jun. 25, 2020 (FR) .................................. FR2006664

(51) Int. Cl.
*B64C 25/50* (2006.01)
*B64C 25/22* (2006.01)

(52) U.S. Cl.
CPC .............. *B64C 25/50* (2013.01); *B64C 25/22* (2013.01)

(58) Field of Classification Search
CPC ....... B64C 25/50; B64C 25/22; B64C 25/505; Y02T 50/80
See application file for complete search history.

(56) References Cited

U.S. PATENT DOCUMENTS 9,139,295 B2 * 9/2015 Benmoussa ............. B64C 25/50

FOREIGN PATENT DOCUMENTS

| EP | 2591998 A1 | 5/2013 |
| FR | 2963606 A1 | 2/2012 |
| GB | 813912 A | 5/1959 |

OTHER PUBLICATIONS

International Search Report, Application No. PCT/EP2021/064480, dated Sep. 8, 2021, 5 pages.

* cited by examiner

*Primary Examiner* — Xiao En Mo
(74) *Attorney, Agent, or Firm* — RANKIN, HILL & CLARK LLP

(57) ABSTRACT

A method for adjusting the angular position of a wheel, in particular a wheel of a landing gear on an aircraft. The wheel being connected to at least one hydraulic cylinder controlled by a servo valve. The method comprising a step for determining an angular deviation between a measurement of the angular position and a setpoint angular position, a first proportional correction step, a second integral correction step and a step for adding the first current and the second current in order to determine a control current of the servo valve. The second integral control step comprising a sub-step for limiting the second current according to a parametric law imposing a second current of zero value when the angular deviation is less, in absolute value, than a first determined threshold.

10 Claims, 4 Drawing Sheets

METHOD FOR ADJUSTING THE ANGULAR POSITION OF A WHEEL, IN PARTICULAR A WHEEL OF AN AIRCRAFT LANDING GEAR

TECHNICAL FIELD

The present invention relates to the angular orientation of a wheel, in particular, of a wheel of a front landing gear of an aircraft.

In a known manner, a front landing gear on an aircraft has a wheel that can be steered to allow the pilot to move the aircraft in the desired direction when the aircraft is on the ground, in particular during a taxi phase. Various solutions are known to check the wheel orientation by documents EP2591998A1, U.S. Pat. No. 9,139,295B2, FR2963606A1 and GB813912A.

As shown in FIG. 1, the front landing gear has a wheel W the angular position ANG of which is controlled by two cylinders, in particular a front hydraulic cylinder V1 and a rear hydraulic cylinder V2. To check the angular position ANG, it is known to use an SC* check system consisting of a hydraulic module LH, usually comprising a hydraulic pump (not shown) and a servo valve S, in order to output a front command COM1* and a rear command COM2* to the front hydraulic cylinder V1 and to the rear hydraulic cylinder V2 respectively.

The check system SC* includes a calculator CAL* configured to receive a setpoint angular position ANGc from the control cab and an angular position measurement ANGm to derive a COM* control current which is transmitted to the hydraulic module MH, in particular to the servo valve S, to modify the angular position ANG of the wheel W so that it corresponds to the setpoint angular position ANGc.

The calculator CAL* is in the form of a computer system that implements an adjustment method which is presented in FIG. 2. The adjustment method includes:
- a step of determining 11 of angular difference ε between the measurement of the angular position ANGm and the set point angular position ANGc,
- a first proportional correction step B1 in order to determine a first current C1* from the angular deviation ε,
- a second integral correction step B2 in order to determine a second current C2* from the angular deviation ε,
- an addition step 12 of the first current C1* and the second current C2* in order to determine a control current COM* of the servo valve S and
- a step of limiting 13 the COM* control current to limit the value of the sum of the currents C1*, C2* and provide a suitable control current COM* to the servo valve S.

Such an adjustment method is generally effective. Nevertheless, with reference to FIG. 3, when the setpoint angular position ANGc (curve 3A) was changed, OSC oscillations of the control current COM* (curve 3B) for the servo valve S were observed, as well as pressure variations in the hydraulic cylinders V1, V2 in stationary operation. In other words, if the setpoint angular position ANGc is not changed, the control current COM* continues to be adjusted unintentionally.

In practice, when the angular deviation ε is close to 0, the integral correction B2 is "loaded" periodically. Indeed, a real servo valve S does not have perfect characteristics. When receiving a control current COM* of low value but not zero, the servo valve S does not activate. As a result, the angular deviation ε is not changed and the control current COM* will increase. When the control current COM* becomes strong enough to control the servo valve S, the servo valve S is activated and the angular deviation ε changes its sign rapidly and then returns close to 0. This periodic phenomenon causes OSC oscillations of the control current COM* for the servo valve S as well as pressure variations in the hydraulic cylinders V1, V2 in stationary operation.

An immediate solution to eliminate this disadvantage is to change the servo valve S in order to obtain a more efficient model in terms of adjustment when the angular difference ε is close to 0. In practice, such a change has many disadvantages from both a technical (integration, certification, etc.) and economic (cost) standpoint.

Another immediate solution would be to deactivate the integral correction to limit OSC oscillations, but this would lower the control performance (static error) and the wear monitoring performance of the servo valve S (zero flow drift, etc.).

The invention thus aims to eliminate at least some of these disadvantages by proposing a new adjustment method that eliminates at least some of these disadvantages.

The invention also relates to an aircraft comprising a landing gear as presented previously.

SUMMARY

The invention relates to a method for adjusting the angular position of a wheel, in particular a wheel of an aircraft landing gear, the wheel being connected to at least one hydraulic jack controlled by a servo valve, the method comprising:
- a step to determine an angular difference between a measurement of the angular position and a setpoint angular position,
- a first proportional correction step to determine a first current from the angular deviation
- a second integral correction step to determine a second current from the angular deviation; and
- a step of adding the first current and the second current to determine a servo valve control current.

The invention is remarkable in that the second step of integral adjustment comprises a substep of limiting the second current according to a parametric law, the parametric law imposing a second current of zero value when the angular deviation is less, in absolute value, than a first determined angular threshold.

Advantageously, thanks to the invention, the integral correction step is inhibited only for small angular deviations, i.e., less than the first angular threshold determined. This avoids a correction by the entire branch, which is untimely and causes a change in cylinder pressure. Actual servo valve defects are thus eliminated without changing the physical architecture, thus avoiding certification steps. In addition, since the integral correction is inhibited on a one-off basis, it continues to be active for the most part when the angular position of the wheel is changed. This ensures optimal control and eliminates side effects.

According to one aspect of the invention, the parametric law limits the second current to a maximum allowed current value when the angular deviation is, in absolute value, between a second determined angular threshold and a third determined angular threshold, the second determined angular threshold and the third determined angular threshold being greater than the first determined angular threshold. The value of the second current is thus limited when the setpoint angular position is changed.

According to one aspect of the invention, the parametric law limits the second current according to an ascending ramp between the zero value and the maximum allowed current value when the angular deviation is between, in absolute value, the first determined angular threshold and the second determined angular threshold.

According to one aspect of the invention, the parametric law limits the second current according to a downward ramp between the maximum allowed current value and the zero value when the angular deviation is between, in absolute value, the third determined angular threshold and a fourth determined angular threshold greater than the third determined threshold.

Transitions (ascending or descending) are thus controlled to limit the second current.

The invention also relates to a system for controlling the angular position of a wheel, in particular a wheel of an aircraft landing gear, connected to at least one hydraulic cylinder controlled by a servo valve, the control system comprising a calculator configured for:
- determine an angular difference between a measurement of the angular position and a setpoint angular position,
- making a first proportional correction so as to determine a first current from the angular deviation
- making a second integral correction so as to determine a second current from the angular deviation,
- summing the first current and the second current to determine a servo valve control current, and
- when performing the second integral correction, limiting the second current according to a parametric law, the parametric law imposing a second current of zero value when the angular difference is less, in absolute value, than a first angular threshold determined.

The invention further relates to a wheel assembly, in particular a wheel of an aircraft landing gear, connected to at least one hydraulic cylinder controlled by a servo valve and a control system as presented previously for determining a servo valve control current.

Preferably, the wheel is connected to at least one first hydraulic cylinder and a second hydraulic cylinder controlled by the servo valve.

Preferably, the assembly comprises a hydraulic module, comprising the servo valve, configured to directly control the first hydraulic cylinder and the second hydraulic cylinder.

The invention also relates to an aircraft landing gear comprising an assembly as presented previously.

BRIEF DESCRIPTION OF THE DRAWINGS

The invention will be better understood upon reading the following description, given as an example, and by referring to the following figures, given as non-limiting examples, in which identical references are given to similar objects.

It should be noted that the figures disclose the invention in detail in order to implement the invention, said figures can of course be used to better define the invention if necessary.

DETAILED DESCRIPTION

The invention relates to a system for controlling the angular position of a wheel, in particular, of a wheel of a front landing gear of an aircraft. In a known manner, a front landing gear on an aircraft has a wheel that can be steered to allow the pilot to move the aircraft in the desired direction when the aircraft is on the ground, in particular during a taxi phase.

Figure 1:
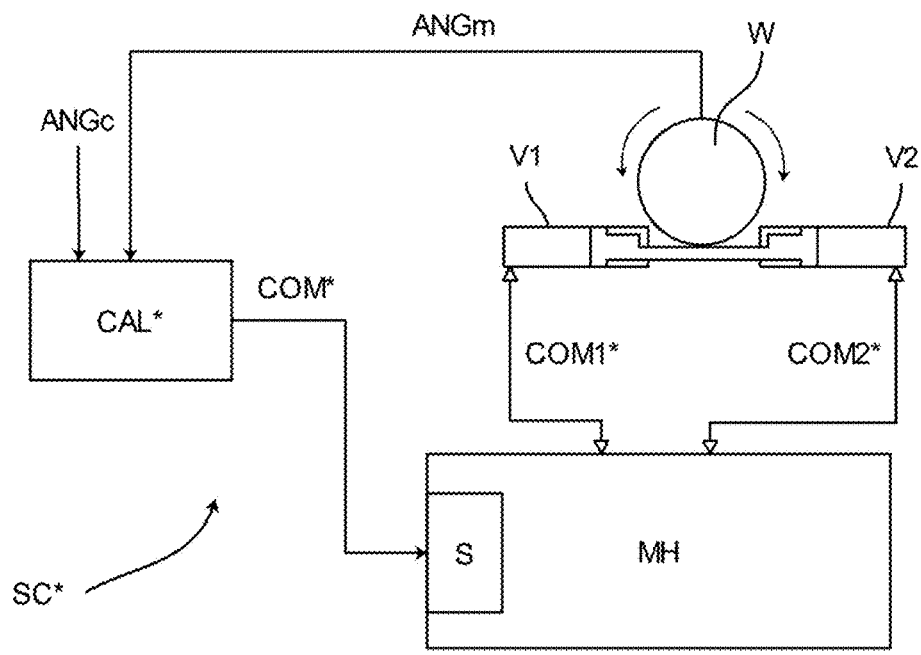
FIG. 1 is a schematic representation of a system for adjusting the angular position of a wheel of a front landing gear according to the prior art.
Figure 2:
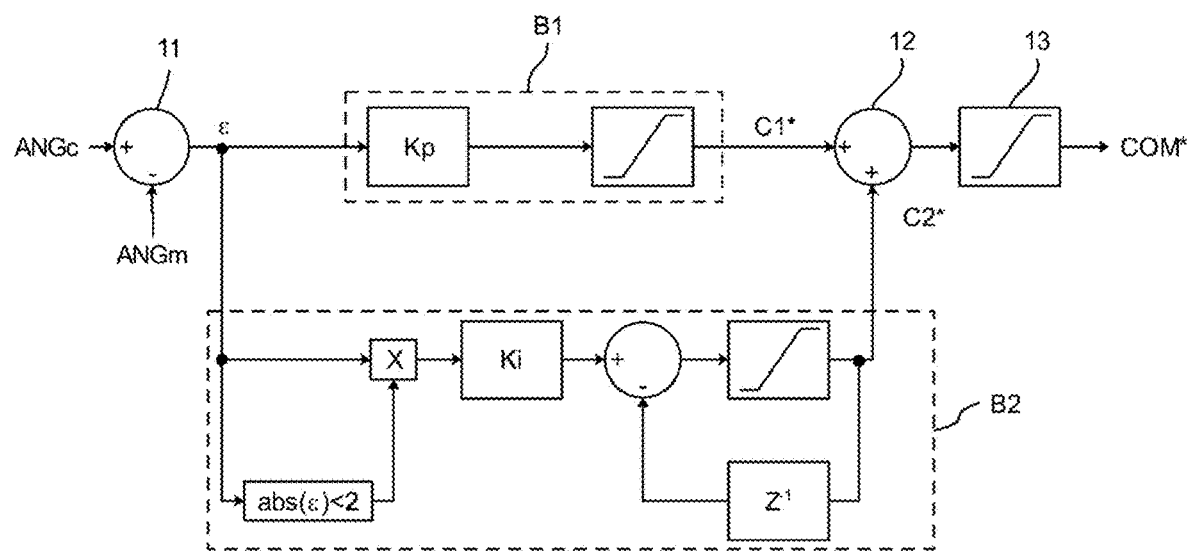
FIG. 2 is a schematic representation of the steps of a method of adjusting the angular position according to the prior art.
Figure 3:
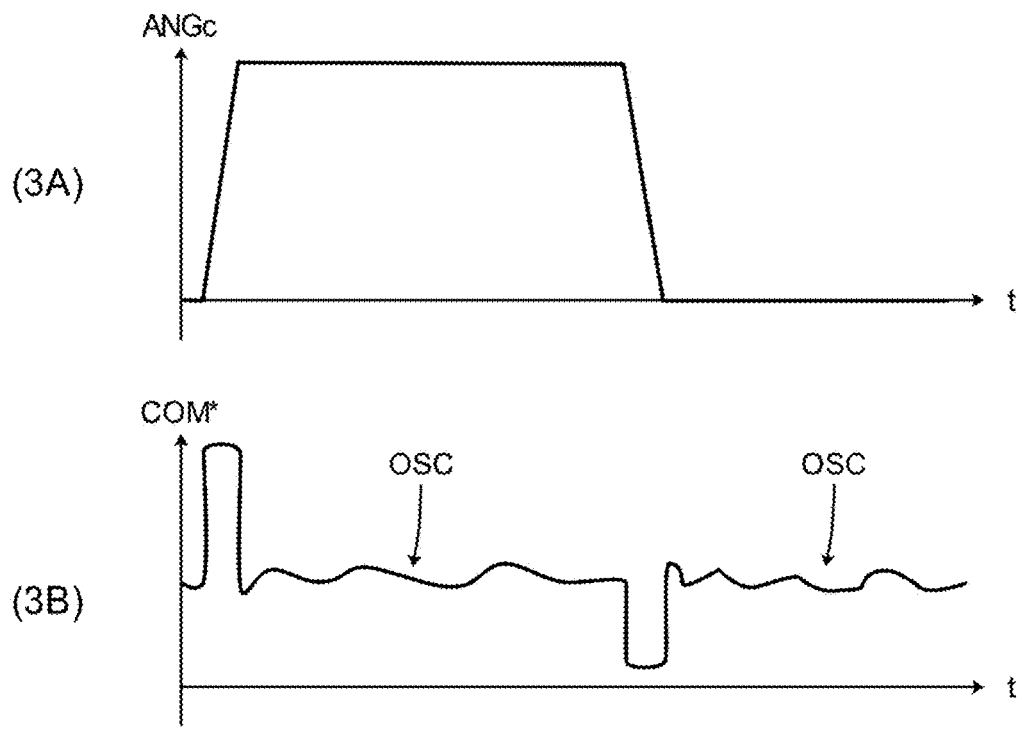
FIG. 3 is a schematic representation of the time sequence of a setpoint angular position and the servo valve control current according to the prior art.
Figure 4:
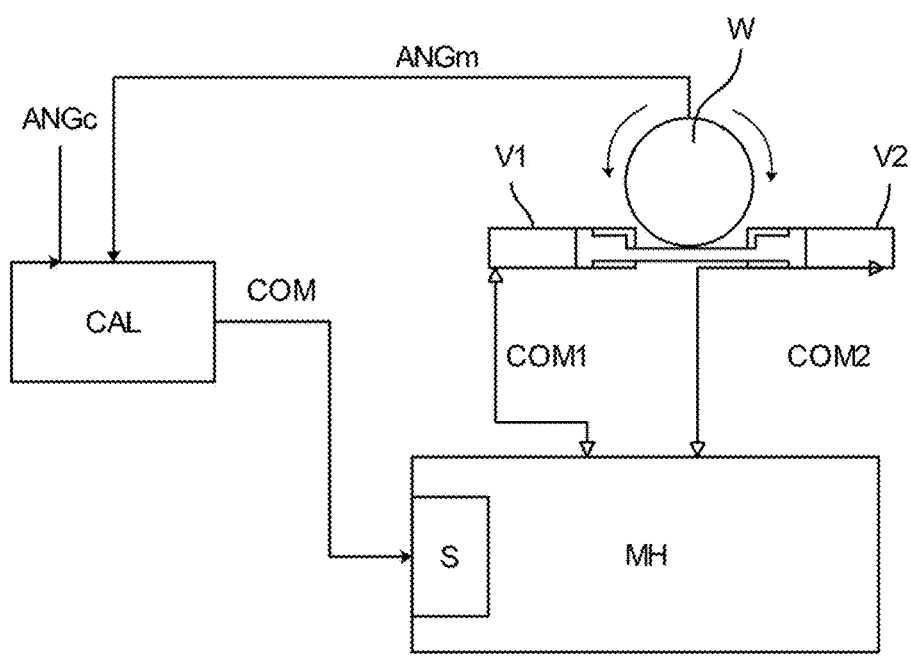
FIG. 4 is a schematic representation of a system for controlling the angular position of a wheel of a front landing gear according to an embodiment of the invention.

Referring to FIG. 4, as previously shown, the front landing gear has a W wheel whose angular position ANG is controlled by two cylinders, in particular a front hydraulic cylinder V1 and a rear hydraulic cylinder V2.

According to the invention, to control the angular position ANG, a control system SC comprising a hydraulic module MH, which comprises a hydraulic pump (not shown) and a servo valve S, is used, in order to issue respectively a front command COM1 and a rear command COM2 to the front hydraulic cylinder V1 and to the rear hydraulic cylinder V2.

The SC control system comprises a CAL calculator configured to receive a setpoint angular position ANGc setting from the control cab and an angular position measurement ANGm to derive a control current COM which is transmitted to the MH hydraulic module, in particular to the servo valve S, to modify the angular position ANG of the wheel W so that it corresponds to the setpoint angular position ANGc.

Figure 5:
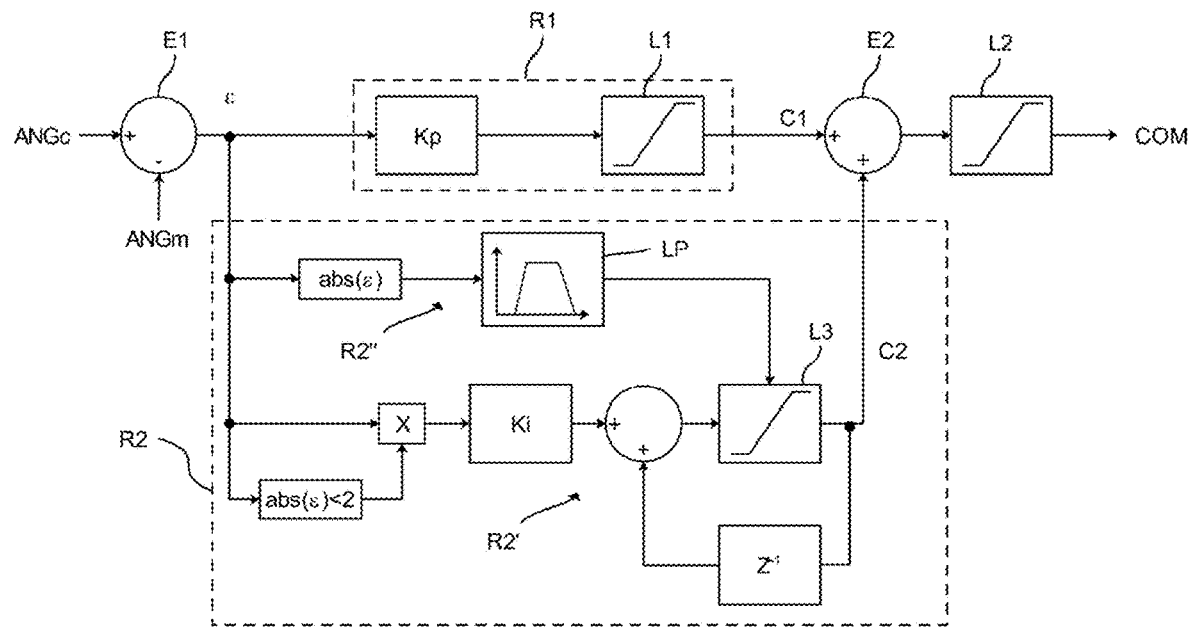
FIG. 5 is a schematic representation of the steps of an angular position adjustment method according to an implementation example.

According to the invention, the calculator CAL is in the form of a computer system which implements an adjustment method which is presented in FIG. 5.

First of all, the adjustment method comprises a step of determining E1 an angular difference ε between a measurement of the angular position ANGm and the setpoint angular position ANGc.

Then, the adjustment method comprises a first proportional correction step R1 in order to determine a first current C1 from the angular deviation ε. With reference to FIG. 5, during the proportional correction step R1 the angular deviation ε is multiplied by a first constant Kp in order to deduct a first current C1 which was previously limited in value by a limiting operator L1. Preferably, the first proportional correction step R1 is analogous to the prior art and will not be presented in more detail.

The adjustment method comprises a second integral correction step R2 so as to determine a second current C2 from the angular deviation ε.

A control current COM of the servo valve S is then determined in an addition step E2 of the first current C1 and the second current C2. The COM control current is limited in value by a limiting operator L2 following the addition of the first current C1 and the second current C2.

The second step of integral correction R2 will now be presented in detail. This includes a sub-step of integration R2" of the angular deviation ε with a second constant Ki in order to obtain the second current C2. Preferably, during the R2' integration sub-step of the angular deviation ε, the integration is activated/deactivated if the difference ε, in absolute value, is between 0 and a predetermined threshold, 2° in this example.

During the integration sub-step R2', the second current C2 is limited beforehand in value by a limiting operator L3 in order to form the control current COM. The integration sub-step is similar to the prior art and will not be presented in more detail.

Preferably, according to the invention, the second integral adjustment step R2 comprises a substep of limiting (R2') the second current C2 according to a LP parametric law. Contrary to a conventional limitation aimed at limiting extreme values, this parametric law LP is defined to avoid any oscillatory phenomenon.

Figure 6:
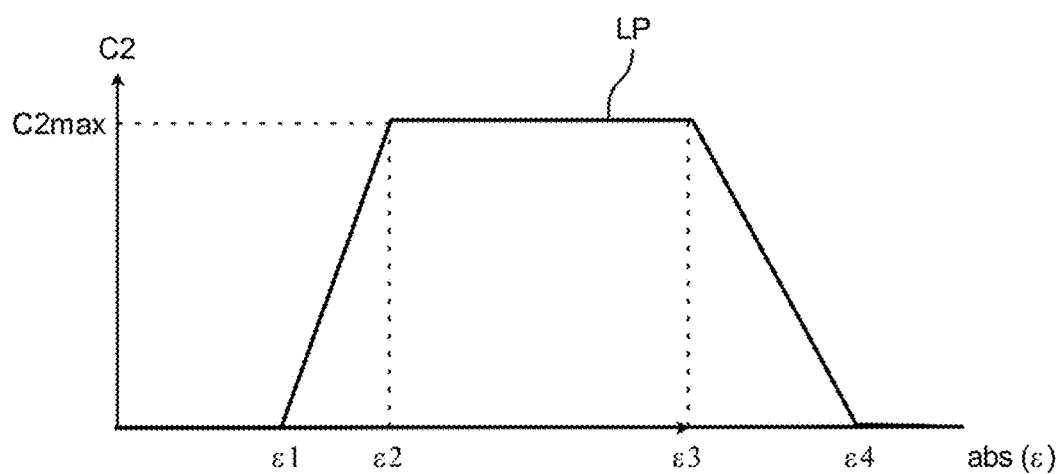
FIG. 6 is a schematic representation of a parametric law for limiting the second current from the integral correction.

The parametric law LP determines a value of the second current C2 as a function of the absolute value of the angular deviation ε. With reference to FIG. 6, a number of fixed angular thresholds are defined with increasing values of ε1, ε2, ε3, ε4. The angular thresholds are determined according to the needs of the adjustment (speed, accuracy, static error, etc.).

When the angular difference ε is less, in absolute value, than the first angular threshold determined ε1, i.e. between 0 and ε1, the parametric law LP imposes a second current C2 with a value of zero. This cancelation of the second current C2 eliminates all oscillations by preventing the integral correction from "loading" intermittently. No current command 02 is issued to the servo valve to control the cylinders V1, V2 the hydraulic pressure of which does not vary, the proportional part. C1 only cancels if the difference is zero. Any oscillatory phenomenon is eliminated without replacing the servo valve S or the jacks V1, V2.

When the angular difference ε is between the second angular threshold determined ε2 and the third angular threshold determined ε3 as an absolute value, the second current C2 is limited to a maximum permitted current value C2max in order to limit the value of the second current C2 and protect the servo valve S.

When the angular difference ε is between the first angular threshold determined ε1 and the second angular threshold determined ε2, the second current C2 is limited according to an ascending ramp between the value zero and the maximum authorized current value C2max. Likewise, when the angular difference ε is between the third determined angular threshold ε3 and the fourth determined angular threshold ε4 in absolute value, the second current C2 is limited according to a downward ramp between the maximum allowed current value C2max and the zero value. Ramps advantageously allow a 'smooth' variation when the differences ε falls below the second angular threshold determined ε2 or above the third angular threshold determined ε3 during the check.

Thus, the second integral correction R2 remains active and is only inhibited when the angular deviation ε is too small to be perceived by the servo valve S. Advantageously, the value of the first angular threshold determined ε1 can be adapted to obtain the desired adjustment.

The calculator CAL is configured to implement the steps of the adjustment method, in particular to:
determine an angular difference ε between a measurement of the angular position ANGm and a setpoint angular position ANGc,
perform a first proportional correction R1 in order to determine a first current C1 from the angular deviation ε
perform a second integral correction R2 in order to determine a second current C2 from the angular deviation ε,
add the first current C1 and the second current C2 to determine a servo valve S control current COM,
when performing the second integral correction R2, limit the second current C2 according to a parametric law, the parametric law imposing a second current C2 of zero value when the angular difference ε is less, in absolute value, than a first angular threshold determined ε1.

Advantageously, it is sufficient to modify the adjustment method implemented by a calculator CAL to benefit from the advantages of the invention, without any other physical change.

Figure 7:
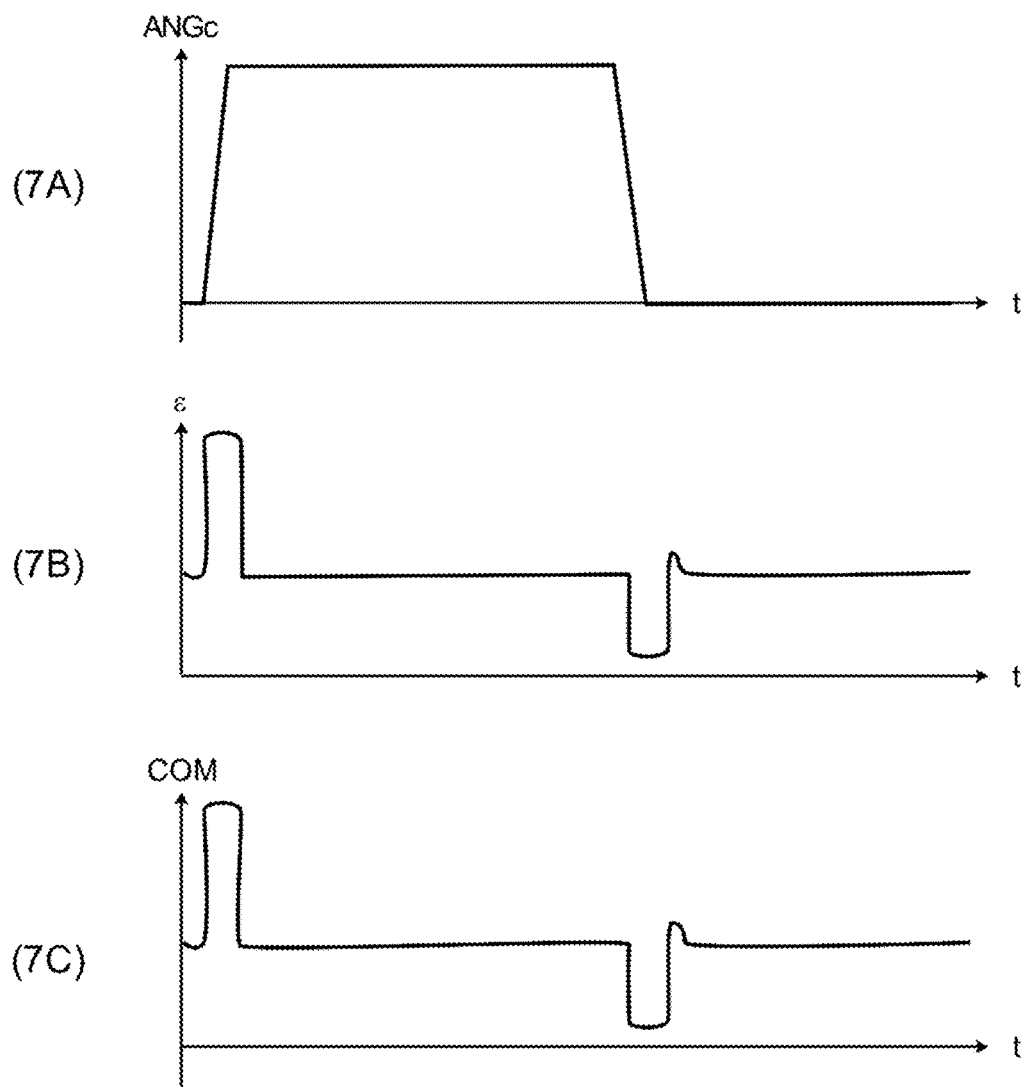
FIG. 7 is a schematic representation of the time course of a setpoint angular position, the angular deviation and the control current of the servo valve according to the invention.

With reference to FIG. 7, when implementing the adjustment method, when modifying the setpoint angular position ANGc (curve 7A), the angular deviation ε is canceled when it is lower than the first angular threshold determined ε1 and does not present any oscillation (curve 7B). As a result, the COM control current (7C curve) is also free of OSC oscillations. Thus, there are no unwanted pressure variations in the hydraulic cylinders V1, V2 at stationary operation. In other words, if the setpoint angular position ANGc is not changed, the control current COM is no longer inadvertently corrected.

The invention claimed is:

1. A method for adjusting an angular position of a wheel, the wheel being connected to at least one hydraulic cylinder controlled by a servo valve, the method comprising:
a step to determine an angular difference between a measurement of the angular position and a setpoint angular position,
a first proportional correction step in order to determine a first current from an angular deviation,
a second integral correction step in order to determine a second current from the angular deviation,
an addition step of the first current and the second current in order to determine a control current of the servo valve, wherein
the second integral adjustment step comprises a sub-step limiting the second current according to a parametric law, the parametric law imposing a second current of zero value when the angular deviation is less, in absolute value, than a first determined angular threshold.

2. The method for adjusting according to claim 1, wherein the parametric law limits the second current to a maximum allowed current value when the angular deviation is between, as an absolute value, the second determined angular threshold and a third determined angular threshold, wherein the second determined angular threshold and the third determined angular threshold is greater than the first determined angular threshold.

3. The method for adjusting according to claim 2, wherein the parametric law limits the second current according to an ascending ramp between the zero value and the maximum allowed current value when the angular deviation is between, as an absolute value, the first determined angular threshold and the second determined angular threshold.

4. The method for adjusting according to claim 2, wherein the parametric law limits the second current according to a downward ramp between the maximum allowed current value and the zero value when the angular deviation is between, as an absolute value, the third determined angular threshold and a fourth determined angular threshold greater than the third determined threshold.

5. A wheel angular position control system connected to at least one hydraulic cylinder controlled by a servo valve, the control system comprising a calculator configured to:
determine an angular difference between a measurement of an angular position and a setpoint angular position,
make a first proportional correction in order to determine a first current from the angular difference,
perform a second integral correction in order to determine a second current from an angular deviation, sum the first current and the second current to determine a control current of the servo valve, and when performing the second integral correction, limit the second current according to a parametric law, the parametric law imposing a second current of zero value when the angular difference is less, in absolute value, than a first determined angular threshold.

6. An assembly of a wheel connected to the at least one hydraulic cylinder controlled by servo valve and the control system according to claim 5 for determining the control current of the servo valve.

7. The assembly according to claim 6, wherein the at least one hydraulic cylinder includes a first hydraulic cylinder and a second hydraulic cylinder, and wherein the wheel is connected to the at least one of the first hydraulic cylinder and the second hydraulic cylinder controlled by the servo valve.

8. The assembly according to claim 6, further comprising a hydraulic module, comprising the servo valve, wherein the at least one hydraulic cylinder includes a first hydraulic cylinder and a second hydraulic cylinder, the servo valve being configured to directly control the first hydraulic cylinder and the second hydraulic cylinder.

9. Aircraft landing gear comprising the assembly according to claim 6.

10. An aircraft comprising the gear according to claim 9.

* * * * *